US012522392B2

(12) United States Patent
Gabusi

(10) Patent No.: US 12,522,392 B2
(45) Date of Patent: Jan. 13, 2026

(54) APPARATUS AND METHOD FOR AUTOMATICALLY PACKAGING CONTAINERS

(71) Applicant: I.M.A. INDUSTRIA MACCHINE AUTOMATICHE S.P.A., Ozzano Dell'emilia (IT)

(72) Inventor: Gabriele Gabusi, Ozzano Dell'emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 1 day.

(21) Appl. No.: 18/705,063

(22) PCT Filed: Nov. 15, 2022

(86) PCT No.: PCT/IT2022/050293
§ 371 (c)(1),
(2) Date: Apr. 26, 2024

(87) PCT Pub. No.: WO2023/084553
PCT Pub. Date: May 19, 2023

(65) Prior Publication Data
US 2025/0002192 A1 Jan. 2, 2025

(30) Foreign Application Priority Data
Nov. 15, 2021 (IT) ........................ 102021000028877

(51) Int. Cl.
*B65B 3/00* (2006.01)
*B25J 9/00* (2006.01)
(Continued)

(52) U.S. Cl.
CPC ............. *B65B 43/46* (2013.01); *B25J 9/0084* (2013.01); *B65B 3/003* (2013.01); *B65B 7/2807* (2013.01); *B65B 7/2821* (2013.01); *B65B 65/003* (2013.01)

(58) Field of Classification Search
CPC ......... B65B 3/003; B65B 3/28; B65B 7/2807; B65B 7/2821; B65B 43/42; B65B 43/46;
(Continued)

(56) References Cited

U.S. PATENT DOCUMENTS 5,944,073 A * 8/1999 Klein ...................... B65B 43/42
141/237
10,737,810 B2 * 8/2020 Franke et al. .......... B65B 35/36
(Continued)

OTHER PUBLICATIONS

International Search Report and Written Opinion for PCT/IT2022/050293, dated Mar. 21, 2023, 12 pages.

*Primary Examiner* — Stephen F. Gerrity
(74) *Attorney, Agent, or Firm* — Rankin, Hill & Clark LLP

(57) ABSTRACT

An apparatus for automatically packaging containers along a work path, wherein one or more containers to be filled are supported by corresponding trays includes at least: a feed station to sequentially feed the trays in which the containers are disposed; a filling unit to sequentially perform a plurality of operations of filling the containers; a first robotic arm capable of performing at least one programmed function, in order to selectively transfer the trays one at a time toward the filling unit, and electronic control means. The apparatus also includes a second robotic arm, which is also capable of autonomously performing the same programmed function as the first robotic arm.

12 Claims, 3 Drawing Sheets

(51) Int. Cl.
*B65B 7/28* (2006.01)
*B65B 43/46* (2006.01)
*B65B 65/00* (2006.01)

(58) Field of Classification Search
CPC ....... B65B 43/54; B65B 43/56; B65B 65/003; B65B 65/006; B25J 9/0084; B25J 9/1682; G05B 2219/45092
USPC ................................ 53/471, 268, 281, 284.6
See application file for complete search history.

(56) References Cited

U.S. PATENT DOCUMENTS

| | | | | |
|---|---|---|---|---|
| 2008/0184671 | A1 | 8/2008 | Fleckenstein et al. | |
| 2012/0006651 | A1* | 1/2012 | Cote | B25J 15/00 198/468.6 |
| 2012/0090268 | A1* | 4/2012 | Krauss et al. | B65B 3/003 53/281 |
| 2016/0200461 | A1* | 7/2016 | Broadbent et al. | B65B 7/2821 53/426 |
| 2016/0376044 | A9 | 12/2016 | Procyshyn et al. | |
| 2018/0126066 | A1 | 5/2018 | Narvekar et al. | |
| 2022/0212818 | A1* | 7/2022 | Schwandt et al. | B65B 3/003 |
| 2023/0373671 | A1* | 11/2023 | Boerret et al. | B65B 7/2807 |
| 2024/0025578 | A1* | 1/2024 | L'Heryenat et al. | B65B 43/50 |

* cited by examiner

APPARATUS AND METHOD FOR AUTOMATICALLY PACKAGING CONTAINERS

FIELD OF THE INVENTION

The present invention concerns an apparatus and a method for automatically packaging containers, such as for example, but not restrictively, vials, bottles, flasks, or other types of containers, able to contain fluid products, in particular liquids, solid or powdered products or gel, and in particular to fill and close them. For example, the apparatus can be used in the pharmaceutical, cosmetic, healthcare, chemical and/or food industries.

BACKGROUND OF THE INVENTION

In the industrial sector of the automated packaging of containers, apparatuses are known that have one or more work stations disposed on a work path, along which the containers are moved in sequence. These known apparatuses can form part of more complex machines, which also comprise other apparatuses for working said containers.

The containers are usually moved between the various work stations by means of traditional mechanical and motorized movement means or devices, which comprise, for example, conveyor belts, gears, chains, slides and/or lifters. However, apparatuses are also known which provide to use anthropomorphic mechanical arms, or robotic arms, to move the containers.

In particular, an apparatus is known which comprises a first station in which the empty containers are fed or picked up, a second station in which the containers are filled, closed, for example by means of suitable caps, and possibly tared and/or weighed, and a third station in which the containers are prepared for a subsequent distribution step. Usually, the containers arrive at the first station supported by suitable container-holding trays, which are provided with a plurality of housing seatings suitable to receive them.

The second station comprises a filling unit, a closing unit, a weighing unit and a single robotic arm, which moves one tray at a time from one unit to another in order to cyclically fill, close and possibly tare and/or weigh the containers.

Using a single robotic arm to move the trays is advantageous compared to traditional movement means or devices, since it does not produce polluting particles and can be cleaned and sanitized very easily. This is particularly advantageous when the apparatus has to operate in aseptic, sterile, or sterilized work environments.

One example of an apparatus for filling containers that uses a single robotic arm to move the trays is described in the US patent application published under the publication number US 2016/0376044.

However, one disadvantage of using a single robotic arm is that during the movement of a tray, to carry out the operations of filling, closing and possibly taring and/or weighing the containers supported in it, the other trays are substantially stationary upstream of the robotic arm, waiting for the latter to be able to pick up another one, once all the operations on the containers of the previous tray have been completed.

It is therefore necessary to wait until all the containers of one tray have been closed and then delivered to the third station before starting a new cycle of operations involving another tray, using the same robotic arm; consequently, the productivity and profitability of the known apparatus are reduced compared with solutions which provide traditional movement means or devices.

There is therefore a need to perfect an apparatus for automatically packaging containers which can overcome at least one of the disadvantages of the state of the art.

In particular, one purpose of the present invention is to provide an apparatus and perfect a method for automatically packaging containers which allow to reduce to a minimum, or completely eliminate, the down times during the operations of filling, closing and possibly taring and/or weighing containers, in particular, but not only, in aseptic, sterile, or sterilized work environments.

Another purpose of the present invention is to provide an apparatus and perfect a method for automatically packaging containers which allow to optimize productivity, reaching values comparable to, or higher than, those obtainable with traditional movement means or devices.

Another purpose of the present invention is to provide an apparatus and perfect a method for automatically packaging containers which allow to carry out, on a plurality of containers, at least the filling operation and preferably also the closing operation substantially continuously, that is, without a break in continuity.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, and to also achieve considerable advantages compared to the state of the prior art, an apparatus according to the present invention, for automatically packaging containers along a work path, wherein one or more containers to be filled are supported by corresponding transport members, comprises at least:

- a feed station to sequentially feed the transport members in which the containers to be filled are disposed,
- a filling unit disposed downstream of the feed station, along the work path, which comprises filling means configured to sequentially perform a plurality of operations of filling the containers,
- a first robotic arm capable of performing at least one programmed function, in order to selectively transfer the transport members one at a time toward the filling means, and
- electronic control means to control at least the filling unit and the first robotic arm, In accordance with one aspect of the present invention, the apparatus also comprises a second robotic arm capable of performing, autonomously, the same programmed function of the first robotic arm, in order to selectively transfer, under the control of the electronic control means, the transport members one at a time toward the filling means; the action of the first and second robotic arms being coordinated by the electronic control means in such a way that while the first robotic arm is moving one of the transport members in correspondence with the filling means, the second robotic arm independently and autonomously moves another of the transport members in order to dispose it adjacent to the transport member moved by the first robotic arm, so that it can be in correspondence with the filling means upon completion of the operation of filling the containers supported by the first transport member, in such a way that the containers supported by the first and second transport members are filled substantially without a break in continuity, that is, eliminating processing down time or reducing it to a minimum.

This gives the advantage of having an apparatus in which productivity is improved and optimized compared to the state of the art, allowing to reach packaging of the order of about 36,000 containers/hour.

In accordance with another aspect of the present invention, the electronic control means are of the programmable type and are configured to control the activation and the spatial and temporal movements of the first and second robotic arms, so that the transfer of the transport members toward the filling means can occur continuously and without interruptions when passing from the first to the second robotic arm.

In accordance with another aspect of the present invention, the first and second robotic arms are controlled by the electronic control means in such a way that each of them makes each of the transport members follow trajectories toward the filling means which are substantially similar, identical, or specular, without the first and second robotic arms interfering with each other.

In accordance with another aspect of the present invention, the filling means comprise at least one delivery member provided with one or more delivery nozzles, the delivery member being disposed, in a filling or delivery operating position thereof, above the work path. Furthermore, the first robotic arm and the second robotic arm are disposed on opposite parts with respect to the work path and are positioned in such a way as to cooperate, from opposite parts, with the delivery member.

In particular, the two robotic arms move the respective transport members in correspondence with the filling means so that the respective transport members are parallel to the work path and coplanar with each other, substantially defining a same work plane.

In accordance with another aspect of the present invention, the filling means also comprise a robotic manipulator on one end of which the delivery member can be interchangeably mounted so that it can be adapted as a function of the specific operational requirements for filling the containers, or for delivery.

In accordance with another aspect of the present invention, the feed station comprises movement means, preferably of the robotic type, configured to transfer the transport members, in which the containers to be filled are disposed, toward the first robotic arm and the second robotic arm.

In accordance with another aspect of the present invention, the apparatus also comprises a closing unit operatively associated with the filling unit and comprising at least feed means to feed one or more closing elements toward the already filled containers disposed in one of the transport members, and a closing means to sequentially close the already filled containers by means of the closing elements.

Furthermore, the fact that the robotic arms are very easy to clean and sanitize provides the advantage of having an apparatus in which the risk of contamination of the containers during their movement is minimized, in particular, but not only, in aseptic, sterile or sterilized working environments.

A method for automatically packaging containers along a work path of an apparatus is also perfected, wherein one or more containers to be filled are supported by corresponding transport members, and wherein the apparatus is provided at least with a feed station, with filling means to perform a step of filling the containers and with a first robotic arm. The method comprises at least: a feeding step in which the transport members, in which the containers to be filled are disposed, are sequentially fed from the feed station along the work path; a first movement step in which the first robotic arm selectively transfers the transport members one at a time toward the filling means so that the supported containers can be filled.

In accordance with one aspect of the present invention, the method also comprises a second movement step in which a second robotic arm selectively transfers, autonomously from the first robotic arm, the transport members one at a time toward the filling means so that the supported containers can be filled. The first and second step of moving the first and second robotic arms are coordinated so that while the first robotic arm is moving one of the transport members in correspondence with the filling means, the second robotic arm independently and autonomously moves another of the transport members to dispose it adjacent to the transport member that is moved by the first robotic arm, so that it can be in correspondence with the filling means upon completion of the filling of the containers supported by the first transport member, whereby the steps of filling the containers supported by the first and second transport members occur substantially without a break in continuity, that is, eliminating processing down time or reducing it to a minimum.

In accordance with another aspect of the present invention, the method comprises an initial configuration step, in which electronic control means are programmed to control the activation and the spatial and temporal movements of the first and second robotic arms, so that the transfer of the transport members toward the filling means occurs continuously and without interruptions.

In accordance with another aspect of the present invention, the electronic control means control the first and second robotic arms in such a way that each of them make each of the transport members follow trajectories toward the filling means which are substantially similar, identical, or specular, without the first and second robotic arms interfering with each other.

In accordance with another aspect of the present invention, in the filling step, the filling means perform, sequentially and substantially without a break in continuity, first the filling of the containers disposed in the first transport member moved by the first robotic arm, and then the filling of the containers disposed in the second transport member moved by the second robotic arm.

In accordance with another aspect of the present invention, the method also comprises a closing step, following the filling step, in which closing means sequentially close the already filled containers by means of suitable closing elements.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
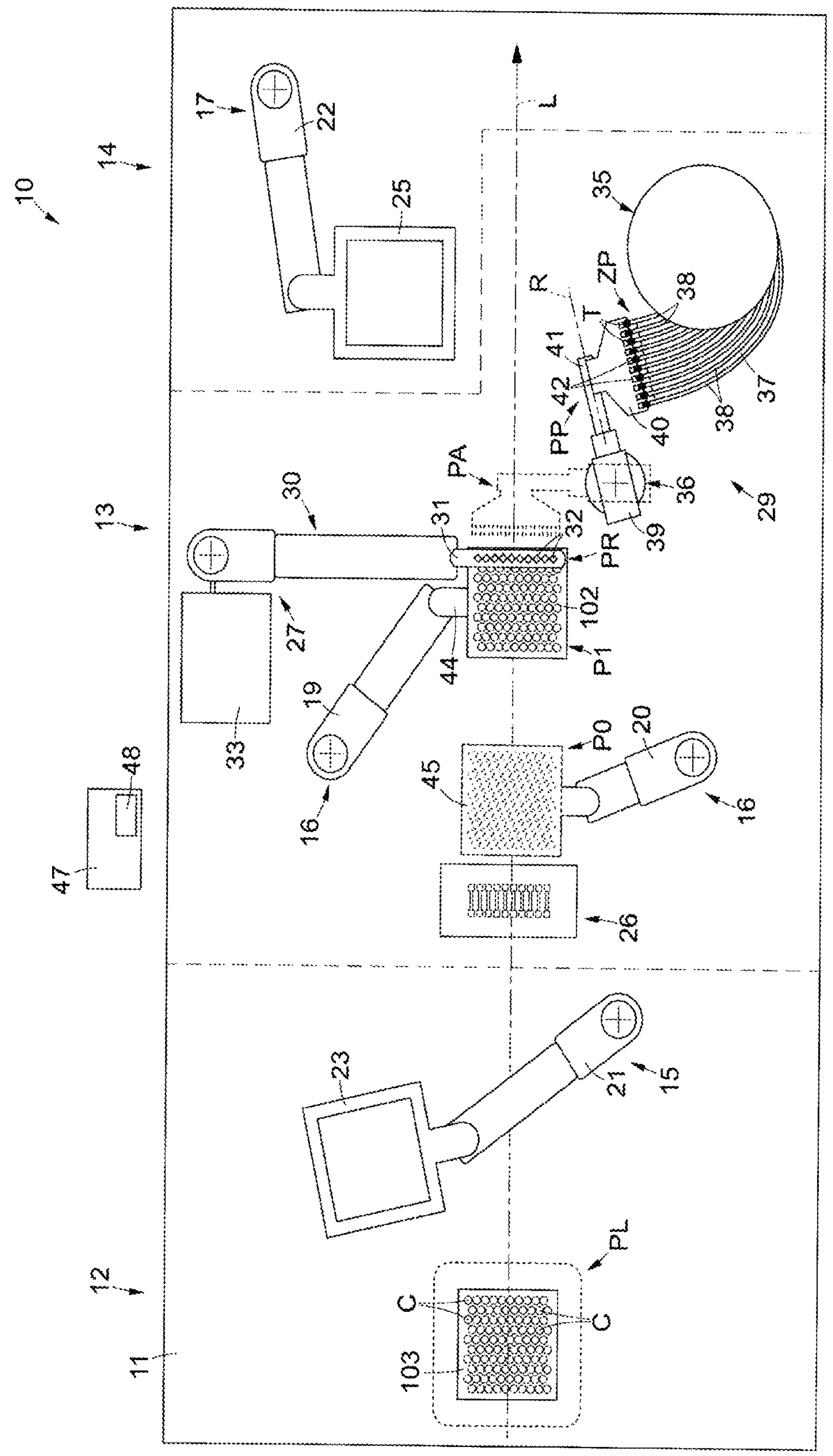
FIG. 1 is a schematic and simplified top view of an apparatus for packaging containers according to the present invention.

FIGS. from 4 to 9 show a schematic and simplified operating sequence of a step of filling and closing the containers disposed on a tray of the apparatus of FIG. 1.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, an apparatus 10 according to the present invention is designed and able to be used to automatically package containers C, in particular at least to feed them along a work path L in order to then fill and close them. In the embodiment shown here, the work path L is rectilinear; however, in other embodiments, not shown in the drawings, it could follow any suitable trajectory whatsoever, even curved and/or on several levels.

The containers C can have any shape and size and can be, without any limitation to generality, vials, bottles, flasks, or other types of containers, capable of containing both fluid products P, in particular liquids, as well as solid or powdered products, or gel.

Figure 3:
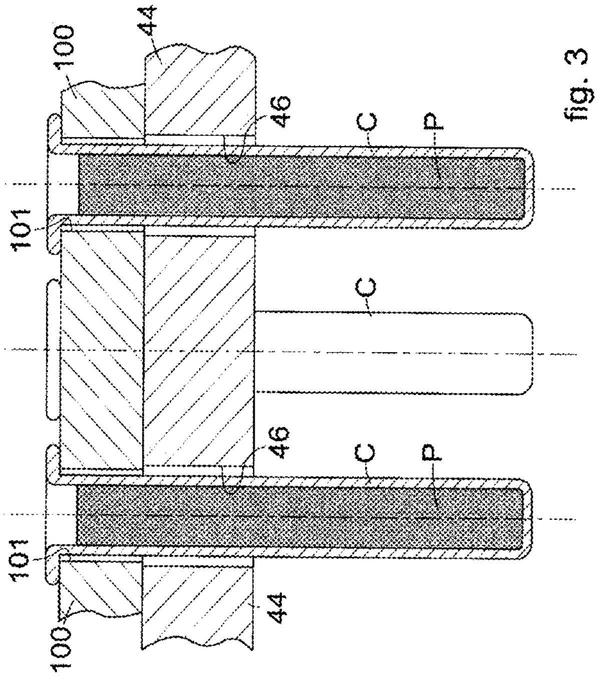
FIG. 3 is a detailed section view of some containers disposed on a tray positioned on a movement support of the apparatus of FIG. 2.
Figure 2:
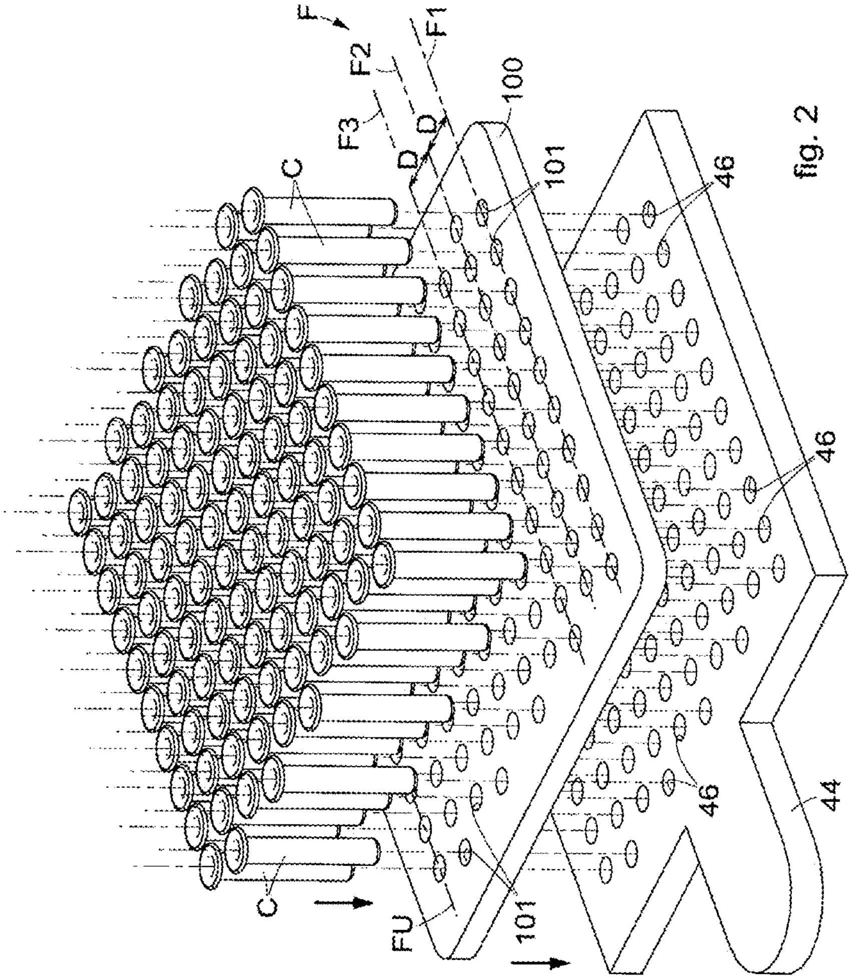
FIG. 2 is an exploded three-dimensional view of a movement support on which a tray can be positioned, in which the containers of the apparatus of FIG. 1 are disposed.

Before describing the apparatus 10 and the corresponding method in detail, in order for these to be better understood, we will now briefly describe, by way of a non-limiting indication, an example of a plurality of containers C, (FIGS. 2 and 3); the latter consists of, or comprises, a certain number of containers C, for example about a hundred, each with the shape of a vial and able to be used in the pharmaceutical, cosmetic, health, chemical and/or food sectors. The plurality of containers C is designed to be supported by a suitable container-holding tray 100, which in the example given here consists of a substantially parallelepiped-shaped plate, which is provided with a plurality of circular housing seatings 101 made through, each one suitable to support a respective container C in a stable, albeit temporary, way. In particular, the housing seatings 101 are disposed according to a positioning matrix consisting of a plurality of lines and columns, such as to form a series of rows F (from F1 to FU, FIG. 2) parallel to each other, reciprocally offset and distanced by a certain constant distance D. We must clarify that, depending on the orientation of the tray 100 with respect to the direction of the work path L, the term "row" can be understood as any row, or column, of the positioning matrix as above.

The apparatus 10 comprises a base 11 on which there are disposed in sequence, from left to right in FIG. 1, along the work path L: a first station 12, or feed station, in which the trays 100, each containing a respective plurality of still empty containers C, are fed and/or picked up from a loading position PL; a second station 13 configured to fill, close and possibly tare and/or weigh the containers C; and a third station 14 in which the containers C, already filled and closed, are organized in order to be sent toward a subsequent distribution and/or boxing step, for example toward other apparatuses or work stations, not shown in the drawings.

Both the first station 12 and also the third station 14, which are indicated and delimited with dashed lines in FIG. 1, can be of any known type whatsoever, or one that will be developed in the future, and fall outside the scope of protection of the present invention. For example, the first station 12 and the third station 14 may be like those described in correlated patent applications for industrial invention filed by, or assigned to, the Applicant of the present patent application.

Along the work path L, each tray 100 containing a plurality of containers C is moved by means of a plurality of movement means, which comprise first movement means 15 disposed in the first station 12, second movement means 16 disposed in the second station 13 and third movement means 17 disposed in the third station 14, as will be described in detail below.

In accordance with one aspect of the present invention, at least the second movement means 16 comprise, or consist of, a first robotic arm 19 and a second robotic arm 20, substantially of a known type.

In accordance with one embodiment of the present invention, the first movement means 15 and the third movement means 17 can also comprise, or consist of, robotic arms, in particular a third robotic arm 21 and a fourth arm robotic 22, respectively, it being understood that in other embodiments other suitable movement means can also be used, such as conveyor belts, gears, chains, slides and/or lifters.

Furthermore, both the third robotic arm 21 and also the fourth robotic arm 22 can be identical to each other and each be provided, at one respective end, with a respective gripping support 23 and 25, which is for example provided with sucker members to selectively lift each tray 100.

We must clarify that by the term "robotic arm" and its declinations, here and hereafter in the description and in the attached claims, we mean, without any limitation to generality, anthropomorphic articulated arms, six-axis robotic arms, SCARA (Selective Compliant Articulated Robot Arm) systems, r-theta robots and groups of linear actuators and rotary actuators, or combinations thereof. In the example given here, the robotic arms are preferably robotic arms with six axes of rotation, which have a rest base, a plurality of reciprocally articulated segments and a gripping head, for example provided with grippers.

In particular, the third robotic arm 21 of the first station 12 has the function of moving each tray 100 from the loading position PL to the second station 13; the fourth robotic arm 22 of the third station 14, on the other hand, has the function of moving each tray 100 from the second station 13 to the third station 14 for a subsequent distribution and/or boxing step.

The second station 13, in addition to the two robotic arms 19 and 20, essentially comprises a weighing unit 26, a filling unit 27 and a closing unit 29, which are mounted on the base 11, each of which is substantially of a known type.

For example, the weighing unit 26 can be of the type described in the Italian patent application no. 102020000011488 filed by the Applicant.

In accordance with one embodiment of the present invention, in which the product P is liquid, the filling unit 27 comprises both a filling device consisting of a robotic manipulator 30, at one end of which there is mounted a delivery member, or delivery head, 31, having a plurality of delivery nozzles 32 and configured to sequentially fill one row F of containers C at a time, and also a pumping and feeding unit 33 operatively connected to the delivery head 31 to pump and feed the liquid product P toward the containers C, as will be described in detail below.

In accordance with one aspect of the present invention, the delivery head 31, as a function of specific operational delivery or filling requirements, can be advantageously interchangeable with another one that has a single delivery nozzle 32, or several rows of delivery nozzles 32, in order to deliver a certain quantity of product P into a single container C of each row F at a time, or simultaneously into each container C of several rows F.

We must specify that the robotic manipulator 30, the delivery head 31 and the delivery nozzles 32 define, or are part of, the filling means of the apparatus 10.

In accordance with other embodiments of the present invention, not shown in the drawings, other suitable filling means or devices of a per se known type can be used, instead of the robotic manipulator 30. For example, the delivery head 31 with the corresponding delivery nozzles 32 could be disposed on the base 11 in a fixed position with respect to the work path L.

The closing unit 29 comprises at least one feed device 35 configured to feed a plurality of closing elements, for example lids, or caps, T, toward a closing device 36 configured to simultaneously close, substantially in a known manner, the filled containers C of at least one row F.

The feed device 35 comprises a chute 37 configured to convey the caps T, through a plurality of guides 38, toward a pick-up zone ZP. The guides 38 are equal in number to the number of housing seatings 101 present in each row F.

The closing device 36 comprises at least one closing member 39 of the rotating type, which is configured to move alternatively and selectively between a pick-up position PP (shown with a solid line in FIG. 1) and an application position PA (shown with a dotted line in FIG. 1), in order to pick up the caps T present in the pick-up zone ZP and take them, that is, apply them, on the containers C of a row F, in order to close them after they have already been filled with the product P, as will be described in detail below.

In the example given here, the closing member 39 is provided with a comb-like member 40 attached on a rotating arm 41 capable of rotating around an axis of rotation R in order to make the comb-like member 40 complete overturns of 180°. At the end of the comb-like member 40 there is a plurality of seatings 42, equal in number to the number of guides 38, configured to pick up and temporarily support the caps T from the pick-up position PP to the application position PA.

In accordance with another aspect of the present invention, the first robotic arm 19 and the second robotic arm 20 are mounted on the base 11 on opposite parts with respect to the work path L and are positioned in such a way as to cooperate, from opposite parts, with the delivery head 31 of the robotic manipulator 30, said delivery head 31 being, in an operating filling, or delivery, position (shown in FIG. 1), advantageously disposed transverse and centered with respect to the work path L.

In particular, the first robotic arm 19 is capable of executing at least one program function, to selectively transfer the trays 100 one at a time, substantially along the work path L, toward the filling unit 27, the closing unit 29, and possibly the weighing unit 26. In particular, when one of the trays 100 is taken in correspondence with the filling unit 27, that is, in correspondence with the delivery head 31 of the robotic manipulator 30, the tray 100 is in a first operating position P1, in which a first row F1 of containers C (FIG. 2 and from 4 to 9) is in a filling position PR (FIGS. 1 and from 4 to 9), that is, exactly below the delivery nozzles 32 of the delivery head 31.

Furthermore, during the operations of filling the containers C (FIGS. from 4 to 9), the first robotic arm 19 is configured to advance one of the trays 100, which is initially located in the first operating position P1, by a certain constant pitch S every time a row F of containers C is filled with the product P, as will be explained in detail below. This advance occurs along the work path L, and the pitch S is advantageously equal to the distance D between the rows F of a generic tray 100.

In accordance with another aspect of the present invention, the second robotic arm 20 (FIG. 1) is capable of performing, autonomously, at least the same programmed function of the first robotic arm 19, so as to selectively transfer the trays 100 one at a time toward the filling unit 27, the closing unit 29, and possibly the weighing unit 26, as specified above for the first robotic arm 19. Specifically, the tray 100 moved by the second robotic arm 20 can be the one that precedes, or follows, the tray 100 moved by the first robotic arm 19.

Using the second robotic arm 20 in correspondence with the second station 13 gives the advantage of optimizing the productivity of the apparatus 10, allowing to reach packaging of about 36,000 containers/hour; that is, a productivity that is possibly obtainable only with apparatuses, known in the state of the art, which provide to use traditional movement means, rather than robotic arms, to move the trays 100.

Please note that the gripping head of the two robotic arms 19 and 20 is associated with a respective movement support 44, 45 (FIGS. 1 and 3) configured to support each tray 100 during the movement in correspondence with the second station 13 and provided with a plurality of through seatings 46 (FIG. 3) disposed coaxially to the housing seatings 101 of each tray 100.

The apparatus 10 (FIG. 1) also comprises electronic control means 47 to control the operation of the first, second and third movement means 15, 16 and 17 and of the mechanical devices and/or members of the weighing, filling, and closing units 26, 27 and 29.

In accordance with another aspect of the present invention, the action of the two robotic arms 19 and 20 is coordinated by the electronic control means 47 in such a way that while one of the two robotic arms 19 or 20 is moving one of the trays 100, for example a first tray 102, in correspondence with the delivery head 31 of the robotic manipulator 30, the other of the two robotic arms 20 or 19 independently and autonomously moves another of the trays 100, for example a second tray 103, in order to dispose it adjacent to the first tray 102 so that it can be in correspondence with the delivery head 31 upon completion of the operation of filling the containers C supported by the first tray 102; whereby the operations of filling the containers C supported by the trays 100 can occur substantially without a break in continuity, that is, eliminating processing down time or reducing it to a minimum.

Furthermore, the electronic control means 47 are of the programmable type and are configured to control the activation and the spatial and temporal movements of the two robotic arms 19 and 20 so that the transfer, that is, the feed of the trays 100 toward the delivery head 31 of the robotic manipulator 30 can occur continuously and without interruptions.

In accordance with another aspect of the present invention, the two robotic arms 19 and 20 are controlled by the electronic control means 47 in such a way that each of them makes each of the trays 100 follow trajectories toward the delivery head 31 of the robotic manipulator 30 which are substantially similar, identical, or specular, without the two robotic arms 19, 20 interfering with each other.

We must also specify that the two robotic arms 19 and 20 move the respective trays 100 in correspondence with the delivery head 31, that is, in the first operating position P1, so that these trays 100 move parallel to the work path L and coplanar with each other, substantially defining a same work plane.

In accordance with possible embodiments of the present invention, the electronic control means 47 comprise at least one central control unit 48.

In accordance with other possible embodiments of the present invention, not shown in the drawings, the electronic control means 47 can comprise, for each robotic arm 19, 20, 21, 22 and for the robotic manipulator 30, a respective control unit, wherein one of the control units has a "master" function, that is, one of command and/or control, while the remaining ones have a "slave" function, that is, dependent on the operations performed by the master.

The operation of the apparatus 10 described heretofore, which corresponds to the method according to the present invention, comprises the following steps.

For clarity of description, below we describe the processing steps relating to the containers C of two trays 100 fed one after the other, in particular a first tray 102 and a second tray 103, respectively, it being understood that this order, or the operating steps referring to one and/or the other tray, must not be considered as a limitation, and that all the other trays 100 are then cyclically subjected to the same processes.

In an initial configuration step, the electronic control means 47 are programmed to control the operation of the first, second and third movement means 15, 16 and 17 and of the mechanical devices and/or members of the weighing, filling and closing units 26, 27 and 29.

In particular, the electronic control means 47 are programmed to control the activation and the spatial and temporal movements of the two robotic arms 19, 20 so that the transfer of the trays 100 toward the delivery head 31 of the robotic manipulator 30 occurs continuously and without interruptions. Furthermore, this is performed in such a way that each of the two robotic arms 19, 20 makes each of the trays 100 follow trajectories toward the delivery head 31 of the robotic manipulator 30 which are substantially similar, identical, or specular, without the two robotic arms 19 and 20 interfering with each other.

In a first feeding step, the first tray 102 in which a plurality of containers C to be filled is disposed is fed in correspondence with the loading position PL of the first station 11.

In a first pick-up step, the third robotic arm 21 picks up the first tray 102 with the empty containers C inside it, moving it toward the second station 13.

In correspondence with the second station 13, in a first movement step the first robotic arm 19 is driven to be positioned in a receiving position P0, so as to receive the first tray 102 from the third robotic arm 21 and transfer it in correspondence with the robotic manipulator 30, positioning it in the first operating position P1.

In a first filling step (FIGS. from 4 to 9) the robotic manipulator 30 is driven to deliver, by means of the delivery nozzles 32 of the delivery head 31, a certain quantity of product P into the containers C of a certain row F at a time, and then move on to the next row. Specifically, this filling step comprises a partial filling sub-step (FIG. 5) in which the robotic manipulator 30 initially fills the first row F1 of containers C. Then, in an advancement sub-step (FIG. 6), the first robotic arm 19 moves the first tray 102 in a known way, making it advance by one step S along the work path L. This allows to take the first tray 102 into a second operating position P2 in which a second row F2 of containers C, not yet filled, is below the delivery nozzles 32 of the delivery head 31 for the corresponding filling. We must specify that the partial filling and advancement sub-steps are repeated cyclically for each row F, until the filling of the containers C of a last row FU of the first tray 102 is completed.

Concurrently with the filling of the containers C of the first tray 102, a first closing step also begins, which comprises various sub-steps including: a feeding sub-step, in which the feed device 35 feeds a plurality of caps T toward the pick-up zone ZP; a pick-up and transport sub-step, in which the closing member 39 is in the pick-up position PP and, by means of the comb-like member 40, picks up the caps T present in the pick-up zone ZP of the chute 37 and then transports them toward the first tray 102, reaching the application position PA (FIG. 5); an application sub-step (FIG. 6), in which the comb-like member 40 of the closing member 39 is rotated counterclockwise by 180° around the axis of rotation R in order to apply the caps T on the containers C; and a return sub-step, in which the closing member 39 returns to the pick-up position PP and the comb-like member 40 is rotated clockwise by 180° in order to start a new pick-up and transport sub-step. As for the filling operations, also the pick-up and transport, application and return sub-steps are repeated cyclically until the closing of the containers C of the last row FU of the first tray 102 is completed.

In particular, the pick-up and transport, application and return sub-steps as described above can be advantageously performed in the time interval in which the filling and advancement sub-steps are performed for each row F.

In the example given here, the application sub-step (FIG. 6) begins when the first tray is taken into a third operating position P3, in which a third row F3 of containers C of the first tray 102 is in the filling position PR and the first row F1 is in a closing position PC.

During the first step of filling and closing the containers C of the first tray 102, in a second feeding step, in correspondence with the first station 12, the second tray 103 is fed and thus begins a second pick-up step, in which the third robotic arm 21 picks up the second tray 103 and takes it in correspondence with the second station 13.

Figures 4, 5, 6, 7, 8, 9:
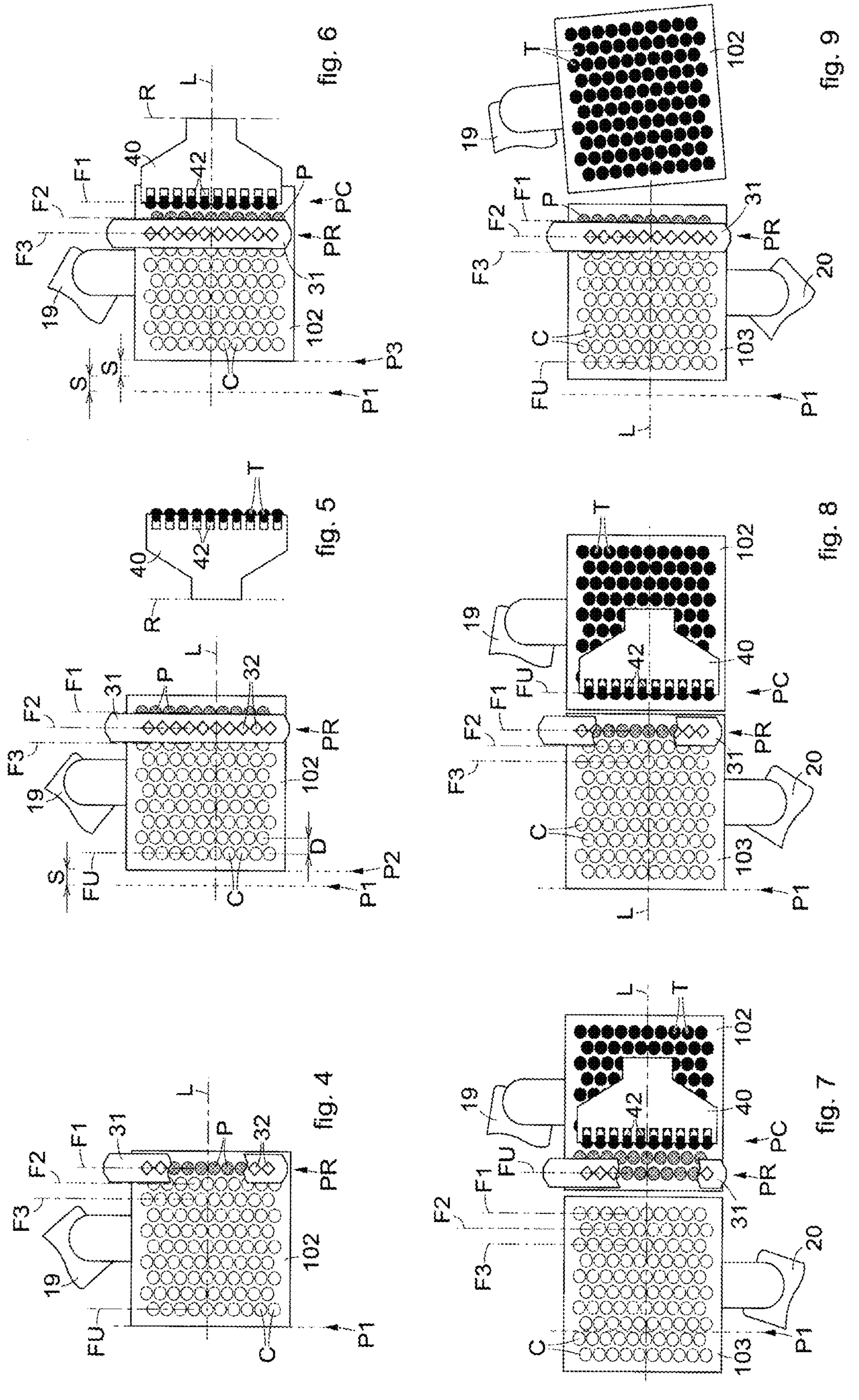

In correspondence with the second station 13, while the first steps of filling and closing the containers C of the first tray 102 are ending, a second movement step begins in which the second robotic arm 20 is driven in order to be positioned in the receiving position P0, so as to receive the second tray 103 from the third robotic arm 21 and transfer it right behind the first tray 102 exactly when the containers C of the last row FU of said first tray 102 are being filled (FIG. 7). By doing so, when the first robotic arm 19 advances the first tray 102 to close the containers C of the last row FU, the second robotic arm 20 moves the second tray 103, along the work path L, taking the first row F1 of containers C of said second tray 103 in the filling position PR, thus starting a second filling step (FIG. 8).

Advantageously, the result of this is that the operation of filling the containers C of two trays 102 and 103, and more generally the steps of filling the trays 100, occur substantially without a break in continuity, that is, eliminating processing down time or reducing it to a minimum.

As shown in FIG. 9, once the first step of closing the first tray 102 has ended, a first distribution step begins in which the first robotic arm 19 transfers the first tray 102, with the containers C filled and closed, toward the third station 14, so that the fourth robotic arm 22 can pick it up and subsequently move it to the third station 14 for a subsequent distribution.

Under the control of the electronic control means 47, the closing and distribution steps are also carried out for the second tray 103, as described for the first tray 102, therefore they are not described again.

Please note that the method can also provide possible steps of taring and/or weighing the containers C, which are usually carried out on a sample basis.

The taring and weighing steps can occur, for example, before the step of filling the containers C of a specific tray 100, for example by extracting a row F of containers C from the specific tray 100 to position them in the respective weighing seatings of the weighing unit 26.

In particular, in the weighing step, the containers C can be filled while they are in the respective weighing seatings of the weighing unit 26, so as perform a targeted check of the quantity of product introduced into each container C.

Once the taring or weighing step has ended, the containers C are returned, in a known manner, to their respective housing seatings 101 of the row F from which they were extracted and the regular operation of the apparatus 10 is resumed.

It is clear that modifications and/or additions of parts may be made to the apparatus 10 and method as described heretofore, without departing from the field and scope of the present invention, as defined by the claims.

It is also clear that, although the present invention has been described with reference to some specific examples, a person of skill in the art shall certainly be able to achieve many other equivalent forms of apparatuses for automatically packaging containers, having the characteristics as set forth in the claims and hence all coming within the field of protection defined thereby.

In the following claims, the sole purpose of the references in brackets is to facilitate their reading and they must not be considered as restrictive factors with regard to the field of protection defined by the same claims.

The invention claimed is:

1. Apparatus for automatically packaging containers along a work path, wherein one or more containers to be filled are supported by corresponding transport members, and wherein said apparatus comprises at least:

a feed station to sequentially feed said transport members in which said containers to be filled are disposed, a filling unit disposed downstream of said feed station, along said work path, which comprises filling means configured to sequentially perform a plurality of operations of filling said containers, a first robotic arm capable of performing at least one programmed function, in order to selectively transfer said transport members one at a time toward said filling means, and electronic control means to control at least said filling unit and said first robotic arm, wherein the apparatus comprises a second robotic arm, which is also capable of performing, autonomously, the same at least one programmed function of said first robotic arm, in order to selectively transfer, under the control of said electronic control means, said transport members one at a time toward said filling means; the action of said first and second robotic arms being coordinated by said electronic control means in such a way that while the first robotic arm is moving one of said transport members in correspondence with said filling means, the second robotic arm independently and autonomously moves another of said transport members in order to dispose this another of said transport members adjacent to the transport member moved by the first robotic arm, so that transport member moved by the second robotic arm can be in correspondence with said filling means upon completion of the filling of the containers supported by the first transport member moved by the first robotic arm, in such a way that said containers supported by the transport members moved by the first and the second robotic arms are filled substantially without a break in continuity.

2. Apparatus as in claim 1, wherein said electronic control means are of the programmable type and are configured to control the activation and the spatial and temporal movements of said first and second robotic arms, so that the transfer of said transport members toward said filling means can occur continuously and without interruptions when passing from the first to the second robotic arm.

3. Apparatus as in claim 1, wherein said first and second robotic arms are controlled by said electronic control means in such a way that each of the first and second robotic arms makes each of said transport members follow trajectories toward said filling means which are substantially similar, identical, or specular, without said first and second robotic arms interfering with each other.

4. Apparatus as in claim 1, wherein said filling means comprise at least one delivery member provided with one or more delivery nozzles, said delivery member being disposed, in a filling operating position thereof, above said work path, and wherein said first robotic arm and said second robotic arm are disposed on opposite parts with respect to said work path and are positioned in such a way as to cooperate, from said opposite parts, with said delivery member.

5. Apparatus as in claim 4, wherein said filling means also comprise a robotic manipulator on one end of which said delivery member can be interchangeably mounted so that delivery member can be adapted as a function of the specific operational requirements for filling said containers.

6. Apparatus as in claim 1, wherein said feed station comprises movement means, configured to transfer said transport members, in which said containers to be filled are disposed, toward said first robotic arm and said second robotic arm.

7. Apparatus as in claim 1, wherein the apparatus also comprises a closing unit operatively associated with said filling unit and comprising at least feed means to feed one or more closing elements toward said already filled containers disposed in one of said transport members, and a closing device to sequentially close said already filled containers via said closing elements.

8. Method for automatically packaging containers along a work path of an apparatus, wherein one or more containers to be filled are supported by corresponding transport members, and wherein said apparatus is provided at least with a feed station, with filling means configured to perform a step of filling said containers, and with a first robotic arm, said method comprising at least: a feeding step in which said transport members, in which said containers to be filled are disposed, are sequentially fed from said feed station along said work path; a first movement step in which said first robotic arm selectively transfers said transport members one at a time toward said filling means, so that the supported containers can be filled, wherein the method also comprises a second movement step in which a second robotic arm selectively transfers, autonomously from the first robotic arm, said transport members one at a time toward said filling means so that the supported containers can be filled; the first and second step of moving said first and second robotic arms, respectively, are coordinated so that while the first robotic arm is moving one of said transport members in correspondence with said filling means, the second robotic arm independently and autonomously moves another of said transport members in order to dispose this another of said transport members adjacent to the transport member that is moved by the first robotic arm, so that the transport member moved by the second robotic arm can be in correspondence with said filling means upon completion of the filling of the containers supported by the first transport member moved by the first robotic arm, whereby the steps of filling said containers supported by said transport members moved by the first and the second robotic arms, respectively, occur substantially without a break in continuity.

9. Method as in claim 8, wherein the method comprises an initial configuration step, in which electronic control means are programmed to control the activation and the spatial and temporal movements of said first and second robotic arms so that the transfer of said transport members toward said filling means occurs continuously and without interruptions.

10. Method as in claim 9, wherein said electronic control means control said first and second robotic arms in such a way that each of the first and second robotic arms make each of said transport members follow trajectories toward said filling means which are substantially similar, identical, or specular, without said first and second robotic arms interfering with each other.

11. Method as in claim 8, wherein during said filling step, said filling means perform, sequentially and substantially without a break in continuity, first the filling of the containers disposed in said first transport member moved by said first robotic arm, and then the filling of the containers disposed in the transport member moved by said second robotic arm.

12. Method as in claim 8, wherein the method also comprises a closing step, following said filling step, in which a closing device sequentially closes said already filled containers by means of suitable closing elements.

* * * * *